United States Patent [19]
Ureshino et al.

[11] Patent Number: 5,746,964
[45] Date of Patent: May 5, 1998

[54] LOADING SYSTEM AND METHOD FOR A TIRE VULCANIZING MACHINE

[75] Inventors: Kashiro Ureshino; Itaru Amano; Masaki Naoi; Kou Takakura, all of Takasago; Takumi Mizokawa, Toyohashi; Katsumi Ichikawa, Takasago, all of Japan

[73] Assignee: Kabushiki Kaisha Kobe Seiko Sho, Kobe, Japan

[21] Appl. No.: 711,310

[22] Filed: Sep. 3, 1996

Related U.S. Application Data

[63] Continuation of Ser. No. 326,945, Oct. 21, 1994, abandoned.

[30] Foreign Application Priority Data

Oct. 21, 1993 [JP] Japan .................... 5-287661

[51] Int. Cl.$^6$ .................................. B29C 35/02
[52] U.S. Cl. ............... 264/315; 264/326; 425/29; 425/38; 414/226
[58] Field of Search ........................ 901/16, 17, 46, 901/47; 414/222, 225, 226, 910; 156/386; 425/38, 29; 264/315, 326

[56] References Cited

U.S. PATENT DOCUMENTS

| | | |
|---|---|---|
| 4,268,219 | 5/1981 | Nakagawa et al. . |
| 4,585,405 | 4/1986 | Capecchi ................... 425/38 |
| 4,629,385 | 12/1986 | Irie .......................... 425/38 |
| 4,728,274 | 3/1988 | Siegenthaler ............... 425/38 |
| 4,773,810 | 9/1988 | Nishimura et al. . |
| 4,894,103 | 1/1990 | Bailey ...................... 156/396 |
| 5,082,519 | 1/1992 | Klose et al. ............... 156/396 |
| 5,159,745 | 11/1992 | Kato ........................ 901/47 |

FOREIGN PATENT DOCUMENTS

| | | | |
|---|---|---|---|
| 1-156183 | 6/1989 | Japan | 901/47 |

*Primary Examiner*—Mathieu D. Vargot
*Attorney, Agent, or Firm*—Oblon, Spivak, McClelland, Maier & Neustadt, P.C.

[57] ABSTRACT

It is the object of the present invention to firstly provide a loading system and loading method of high working efficiency, and secondly, to provide a loading system and method in which a high precision of loading onto a center mold can be regularly assured without the need for repeated correction checks. The loading system includes a transport car 2 movable along a plurality of tire vulcanizing presses 1 arranged in a line; a robot arm 3 mounted on said transport car 2 for movement in three XYZ dimensions to a prescribed position in a desired stance; and a green tire chuck 6 fixed to the end of said robot arm 3. A load method essentially comprises the steps of picking-up, transportation, loading and chucking during shaping, of a green tire largely through movement of the robot arm of said system. Further, a position detection sensor such as a visual sensor is mounted on the end of the robot arm 3 together with the chuck 6, and said position detection sensor is used to monitor a prescribed datum such as a tally mark of said vulcanizing press and thereby effect the positioning of said robot arm in at least two dimensions XY.

15 Claims, 6 Drawing Sheets

LOADING SYSTEM AND METHOD FOR A TIRE VULCANIZING MACHINE

This application is a Continuation of application Ser. No. 08/326,945, filed on Oct. 21, 1994, now abandoned.

FIELD OF THE INVENTION

This invention relates to a loading system and method for transporting green tires (pre-vulcanized rubber tires) to a vulcanizing press and loading said green tires onto a specific position of the vulcanizing press.

DESCRIPTION OF THE PRIOR ART

In a typical tire vulcanizing factory, several tire vulcanizing presses are arranged in a line. Green tires are transported to and loaded onto a specific position of the mold of each press after which the molds are closed together and vulcanizing molding occurs. A loader for transporting and loading said tires is securely fixed to each vulcanizing press. In the case of twin type vulcanizing press which has a pair of mold sets, two loaders are fixed thereto. These loaders have arms rotatable in a horizontal plane and on the end of these arms are mounted chucks. The arms are supported for vertical displacement with respect to their support posts.

The arm of the loader is rotated as far as a cradle located in front of the vulcanizing press, lowered and a green tire already loaded onto the cradle is gripped by the chuck. Then the arm is raised and rotated as far as the center of the tire press (usually directly above the bladder operating mechanism). The arm is then lowered and the green tire is thus loaded onto the center of the mold. The green tire remains gripped by the chuck until the so-called shaping of the tire is completed.

The loading of tires onto the cradle is generally carried out by hand but in some cases conveyors are used. However in the case a conveyor is used the tires are loaded onto the conveyor by hand.

In the vulcanizing process of the vulcanizing press, the operation time of the loader is extremely short compared to the time required for vulcanization, and even in the case of passenger car tires, the operation time of the loader occupies no more than 2-3% of the time for the whole cycle. However, since the cost of the loader is as much as 10% of the cost of the complete vulcanizing press, the prior art loading system was not very cost-effective.

Also, with the wide use of high performance tires, high precision loading of the tire onto the center of the mold is required. As mentioned above the prior art loaders are mounted on the vulcanizing press and green tires are loaded onto the center of the mold by rotation of the arm of the loader. The positioning accuracy of the tires on the center of the mold thus depended not only on the degree of precision of the component parts comprising the loader but also on the degree of precision of assembly of those parts. Accordingly, even if a high precision was at first achieved, because the degree of precision of assembly tends to decrease with use, regular centering checks had to be made which are laborious. If such checks were not carried out, the high precision at first achieved was lost.

SUMMARY OF THE INVENTION

This invention was made in light of the above mentioned problems in the prior art devices, and its object is to provide a loading system and loading method of high operating efficiency and for which a loading of tires onto a mold center of high loading accuracy can be assured without the need for repeated centering checks.

A loading system solving the above mentioned problems essentially comprises a robot arm which can be moved in three dimensions to a prescribed position in a desired stance mounted on a transport car which is itself displaceable along a plurality of tire vulcanizing presses arranged in a line, and a green tire chuck fixed on the end of said robot arm. The load method essentially comprises the picking-up, transporting, loading, and chucking during shaping, of the green tire largely through the movements of said robot arm of the above loading system. The transport car is not limited to travel along the line of vulcanizing presses but can also be moved in a direction towards said vulcanizing presses as well as being movable away from its travel path along the line of the vulcanizing presses. Also, it is preferable to employ 2 or more transport cars.

Furthermore, in order to effect positioning, this invention requires mounting at the end of said robot arm together with said chuck, a position detection sensor such as a visual sensor for detecting a prescribed datum, and effecting positioning in for example the X and Y directions by monitoring said prescribed datum using said position detection sensor.

Since the transport car travels along the line of the vulcanizing presses, it is possible for a single transport car to serve several vulcanizing presses, and the robot arm and the chuck mounted on the end of the robot arm effect the picking-up, transportation, loading and chucking during shaping, of the green tires. By branching the track of the transport car into branch lines extending towards the vulcanizing presses, the serving range of each transport car is increased since the plurality of transport cars can travel past each other, and by further branching the track into refuge lines, any transport cars in need of maintenance can be removed from the path of the remaining transport cars.

By mounting a position detection sensor for detecting a prescribed datum of the vulcanizing press, on the end of the robot arm for positioning, then even if there is a small discrepancy in the stop position of the transport car, since the arm itself moves towards the prescribed datum of the vulcanizing press, proper positioning is effected irrespective of the degree of precision of assembly. Further, the position detection sensor can also effect positioning by monitoring a prescribed datum of the green tire, and thus the function of grasping the green tire can also be assuredly carried out even if the transport car stops in an imprecise position.

DETAILED DESCRIPTION OF THE EMBODIMENTS

Figure 1:
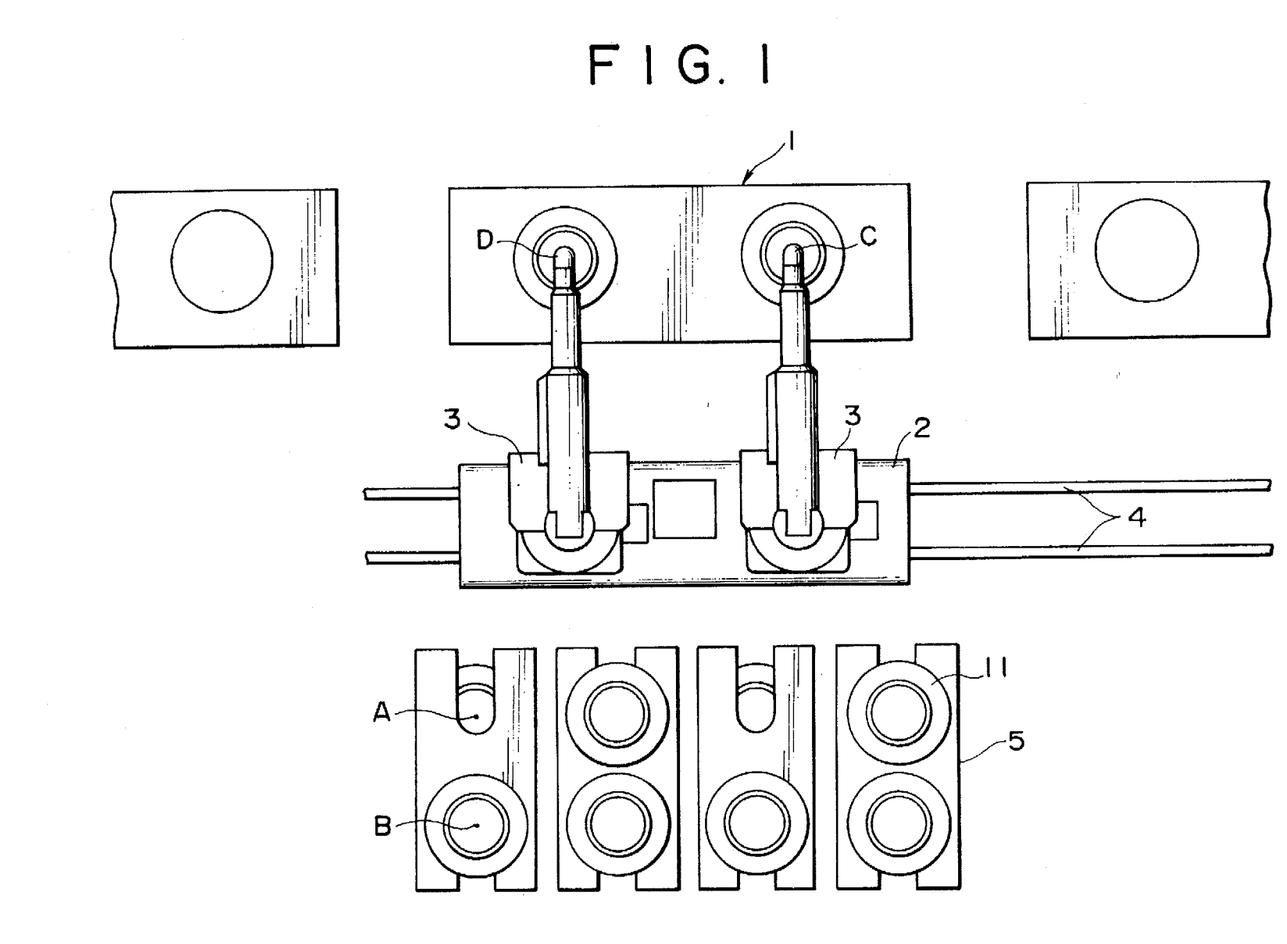
FIG. 1 is an overhead view of the loading system of the present invention.

The embodiment of this invention shall be described below with reference to the figures. FIG. 1 is an overhead view of the main parts of the load system. The embodiment to be described below is one in which a twin type tire vulcanizing tire press is the object of loading. In the case of a single type vulcanizing press (vulcanizing press having only one mold set), the construction is exactly the same except that only one arm is mounted on the transport car.

In FIG. 1, 1 denotes a tire vulcanizing press, 2 denotes a transport car, 3 denotes a robot arm, 4 denotes a rail track, and 5 denotes a pallet for use in the transport of green tires.

Several tire vulcanizing presses are arranged in a line, and a rail track is buried in the floor parallel to this line of vulcanizing presses. Pallets 5 are delivered to the opposite side of rail track 4 to the vulcanizing presses 1 by for example a wheel loader. Two green tires are loaded onto each pallet in positions marked A and B and are generally transported whilst loaded onto the pallet. Robot arm 3 is movable to and from positions marked A, B of a specific pallet to center positions marked C and D of a specific vulcanizing press. Robot arm 3 grips a green tire 11 and carries it towards the center positions C and D of a tire vulcanizing press.

Figure 2:
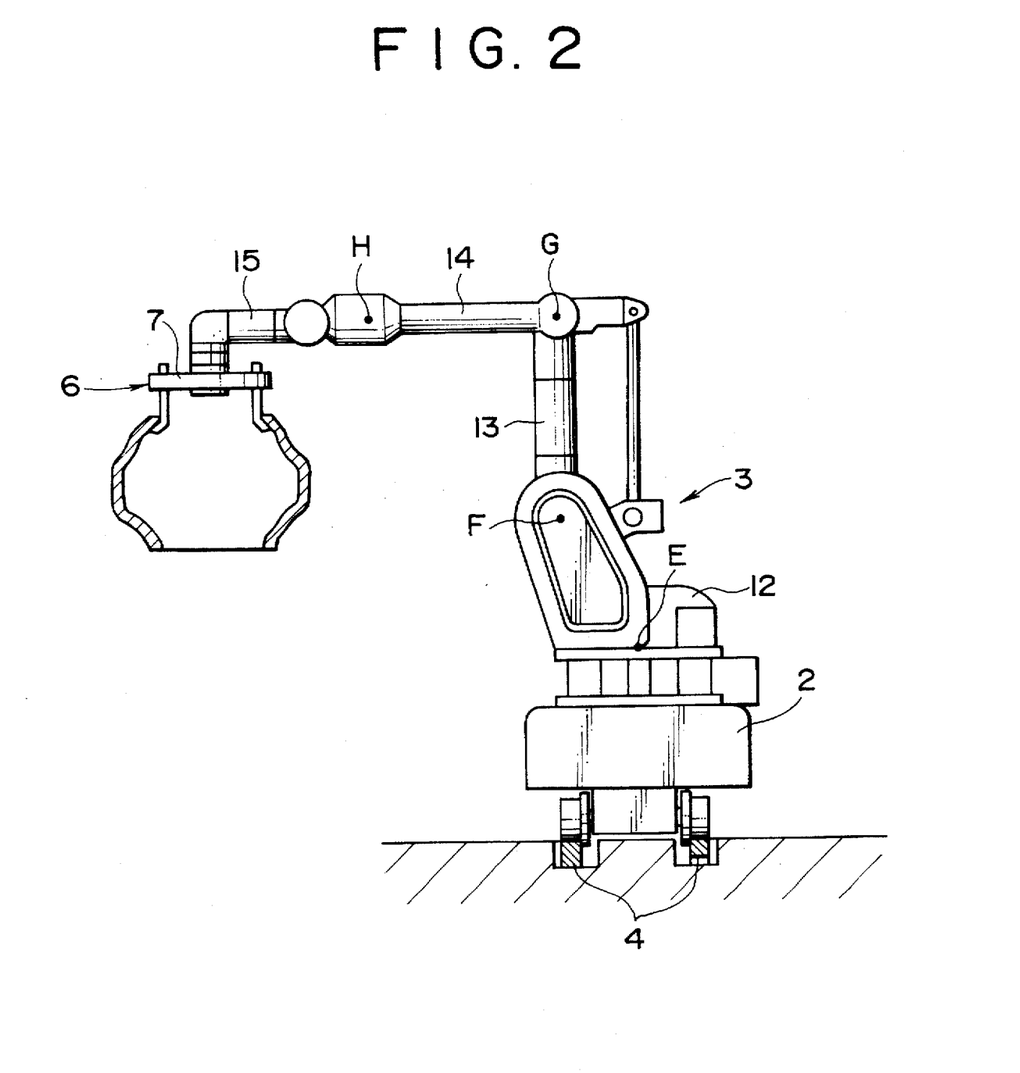
FIG. 2 is a side view of the transport car and transport car.

As shown in FIG. 2, robot arm 3 is mounted on top of transport car and comprises rotation arm 12, No. 1 arm 13, No. 2 arm 14 and No. 3 arm 15. This robot arm is rotatable about point marked E, and flexible about positions marked F, G and H. No. 3 arm 15 is thus displaceable in three XYZ dimensions whilst being maintained in a horizontal position. On the underside of the end of robot arm 3 is mounted a chuck 6 and a visual sensor 7.

Figure 3:
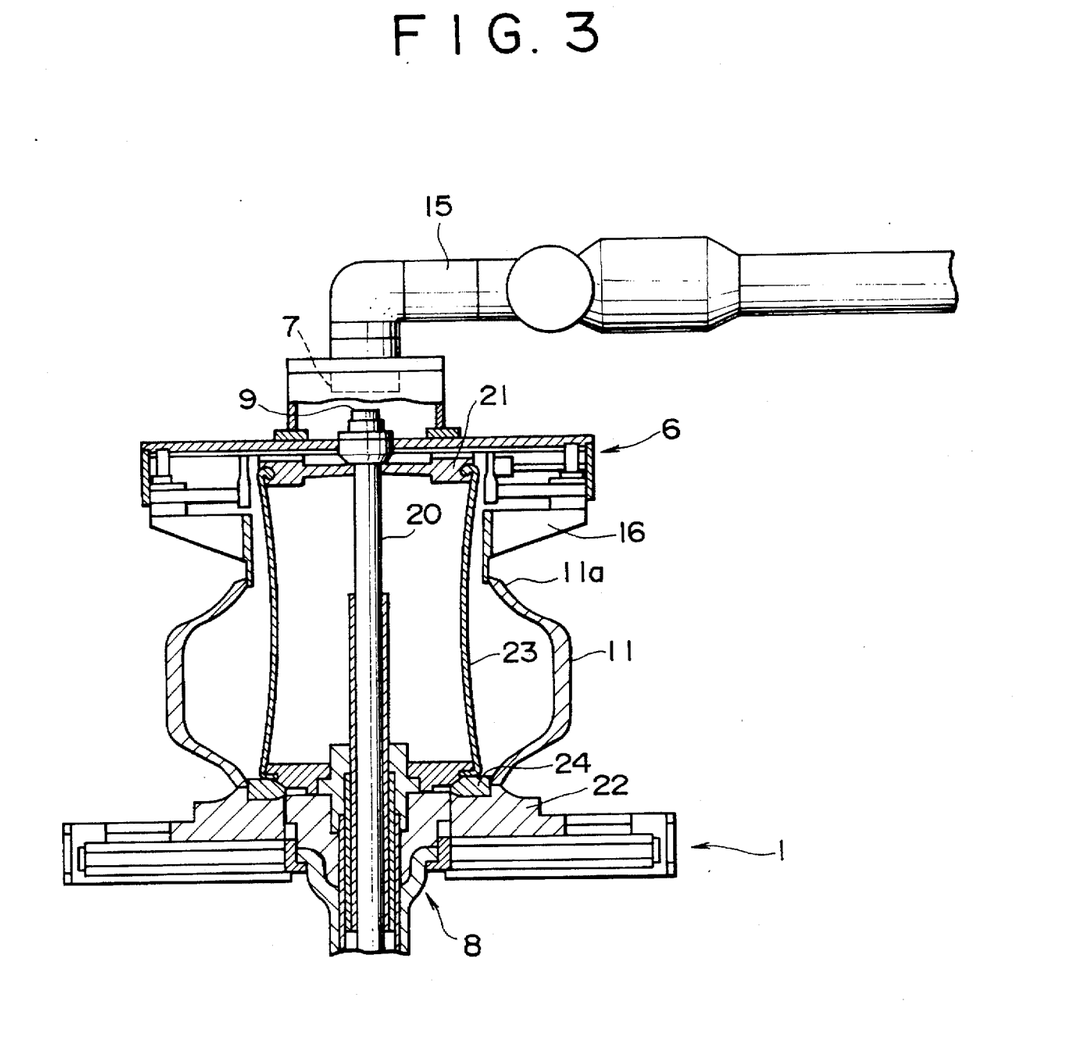
FIG. 3 is a cross-sectional view showing the green tire loading condition effected by the robot arm.

Also, as shown in FIG. 3, chuck 6 has chuck paddles 16 equally spaced about its circumference which are movable simultaneously in a radial direction. These chuck paddles 16 grasp the inner side or outer side of the top part of the bead part 11a of a green tire 11. In the center of the tire vulcanizing press is mounted a bladder operating device 8, which comprises a center post 20 which can be elevated and lowered, and bladder 23 held between the bead ring 24 of the lower mold 22 and bead ring 21 fixed at the top end of center post 20. A tally mark 9 is attached to the center position of the very top of center post 20 as a prescribed datum. The visual sensor 7 discerns this mark in two dimensions in a similar way to a television, detects the discrepancy in position from this tally mark and controls the robot arm as a whole such that No. 3 arm 15 is positioned directly above tally mark 9.

In the embodiment shown in the Figures, visual sensor 7 is mounted at the inner central portion of chuck 6.

Also, the prescribed datum is not limited to a tally mark attached to the very top of center post, but could also be a specific structural feature such as the central part of lower mold 22. In such a case, visual sensor 7 effects positioning by monitoring said specific structural feature. Of course, the visual sensor can also be used when picking up a green tire 11 from the pallet 5. Then, its use is not necessarily limited to the monitoring of a position of the green tire 11 and it can when necessary also be used to distinguish between different kinds of green tires. In addition, a distance sensor can also be mounted together with the above described visual sensor so that not only the position in dimensions with respect to the prescribed datum of the tire vulcanizing press but also the height can be adjusted.

By using this kind of positional correction effected by visual sensing, there is no longer any need to position the transport car in front of the vulcanizing press with strict precision. This is because the positioning during the picking-up of the green tire 11 and loading of the green tire 11 onto the mold center is corrected and thus a positioning of high precision is assured. If one attempts to effect the positioning by pure precision of assembly of the robot arm and the transport car, it becomes necessary to stop the transport car in a strictly precisely defined position.

It is also conceivable that mechanical Stop Position Assurance Means which eject a positioning member after the transport car has traveled past the specific position to hold the transport car in the specific position could be used. However the position correction means using visual sensing is simpler and more effective.

At present, since high precision of within 0.25 mm is required for the centering of the chuck 6 on the mold center of the tire vulcanizing press, position detection using a visual sensor 7 and correction of centering are essential. The set up in which a tally mark 9 is attached to center of the top of centerpost 20 of the bladder operating device 8 is a system in which the needs for high precision can be flexibly met.

Next, the loading method using the above described loading system shall be described. In FIG. 1, the chuck of robot arm picks up a single green tire from position A of pallet 5 and through displacement in three XYZ dimensions, approaches mold center positions C, D of the tire vulcanizing press 1. Then whilst correcting its position through use of the tally mark 9 on top of the center post 20 of FIG. 3, as shown in the Figure, it loads the green tire onto the bead ring 21 of the lower mold 22.

Figure 4:
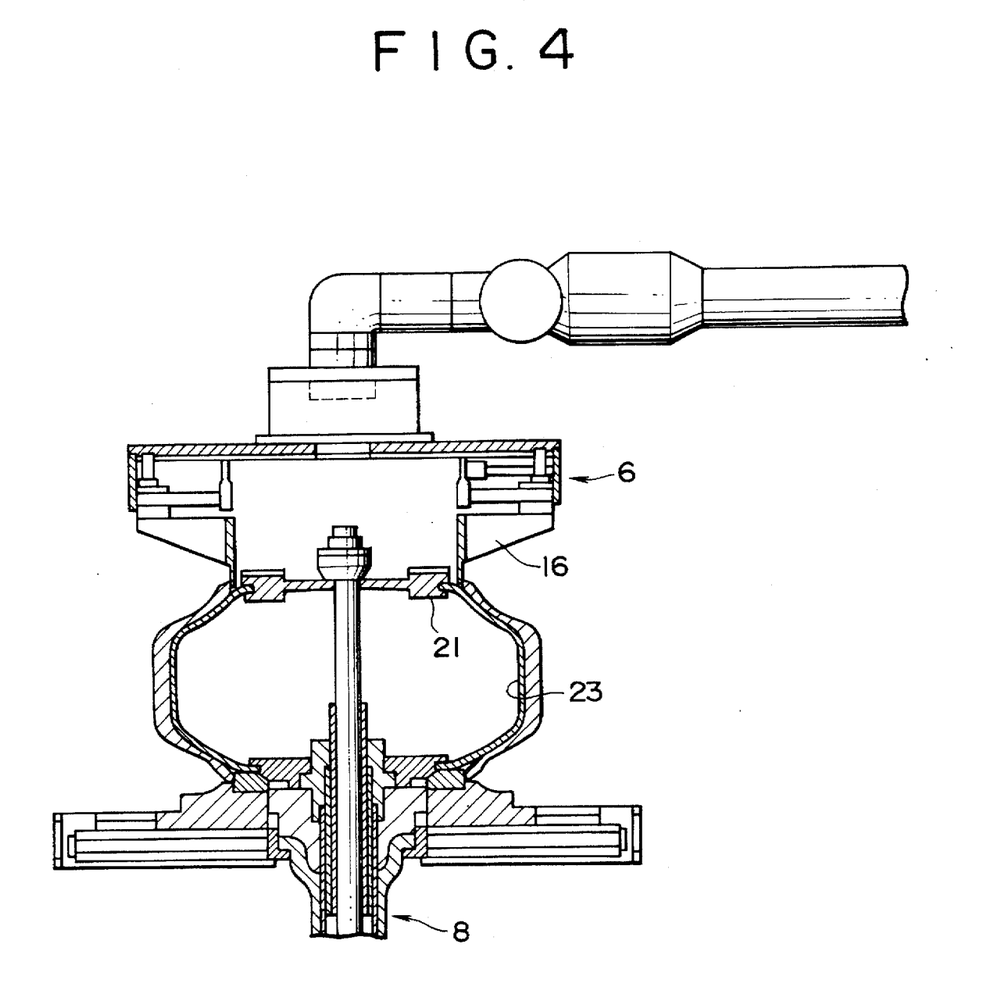
FIG. 4 is a cross-sectional view showing the holding condition effected by the robot arm during shaping.

Then as is shown in FIG. 4, at the same time as the bead ring 21 of bladder operating device 8 is lowered, vulcanization internal pressure medium such as steam, nitrogen gas etc. are supplied to the inside of bladder 23, bladder 23 inflates and the so-called shaping of the tire is performed. During this shaping, the green tire 11 is held chucked by the chuck paddles 16. However the up and down movements of the chuck 6 can be freely controlled as necessary (in response to any movement of the green tire in the vertical direction during shaping).

Also, in the above described embodiment, the case in which the mounting of the green tire and the subsequent shaping is performed using a so-called standing post type bladder operating device 8 has been described. However, the holding and operation of the green tire using chuck 6 are basically the same even in the case when a bladder well type in which the bladder is lowered into a well, raised for shaping and inflated by internal pressure medium is employed. Furthermore, the position detection sensor used for positioning is not limited to a visual sensor but may also be a laser etc..

Next, the travel of transport car 2 shall be described with reference to FIG. 5. The transport are travels to and stops in front of a tire vulcanizing press requiring transportation of a green tire. Next, as shown by arrows 1 and 2 it picks up a specific green tire from a nearby pallet 5 and transports the green tire 11 as shown by arrows 3 and 4 to the center of tire vulcanizing press 1 through the controlled movement of robot arm 3. The robot arm is lowered straight down and the green tire is loaded onto a specific position. It is possible for one transport car to serve 5 or 6 vulcanizing presses.

Figure 5:
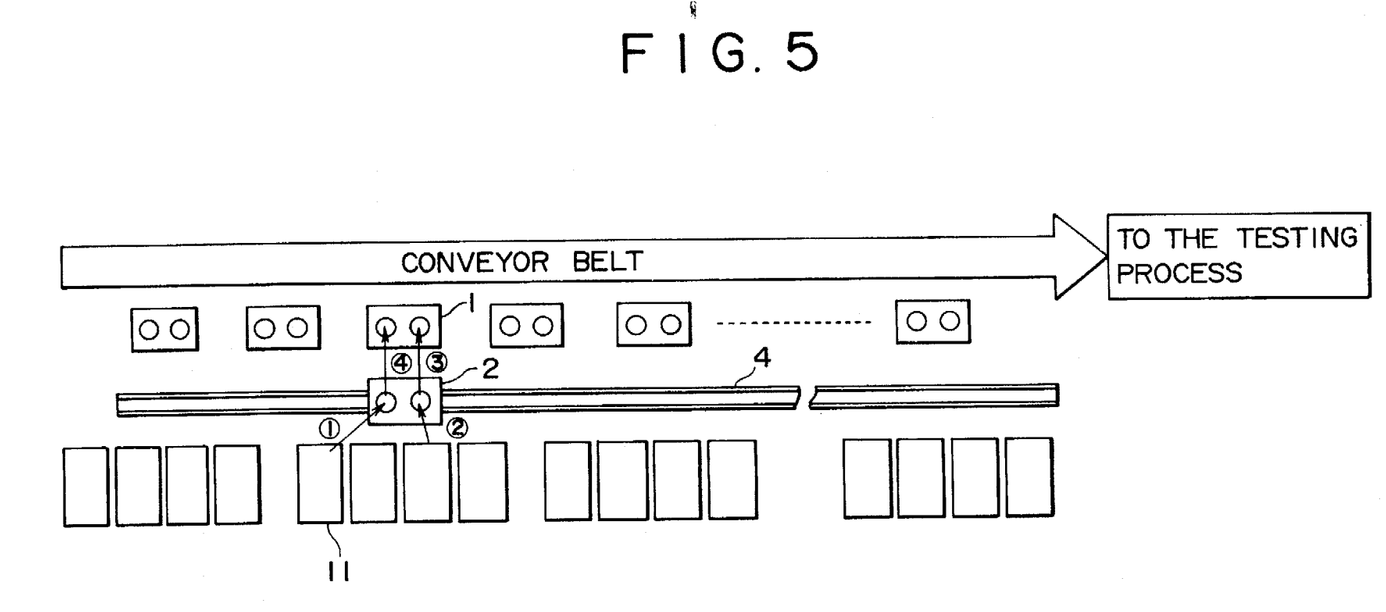
FIG. 5 is a layout diagram showing the transportation path of the transport car according to one embodiment of the present invention.

However, as shown in FIG. 5, in the case when a specific number of vulcanizing presses are served by a single transport car 2, if this single transport car 2 or its robot arm 3 break down or should become inoperative due to a sudden accident, the operation of the plurality of vulcanizing presses served by that transport car is for all intents and purposes stopped.

Figure 6:
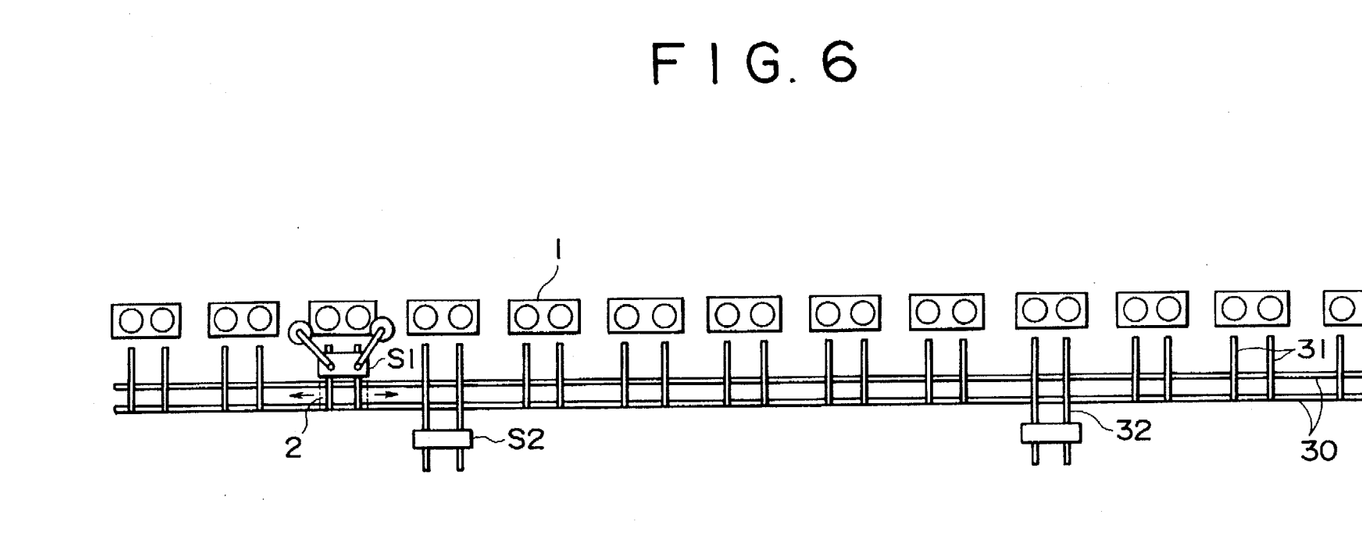
FIG. 6 is a layout diagram showing a transportation path of the transport car of another embodiment of the present invention.

A system which avoids this is shown in FIG. 6. The rail track 30 upon which transport cars 2 travel is laid down parallel to the line of vulcanizing presses. The loading work of the transport car does not take place from this rail track 30, but rather transport cars 2 are movable towards and away from each vulcanizing press by means of a series of branch rails 31 branching from said rail track 30 and extending as far as the front of each vulcanizing press. On each of these branch rails is located a work station S1 at which the loading work of the transport car takes place.

The transport car travels on rail track 30 in the left and right direction but must also be able to travel from rail track 30 to each station S1 in a direction perpendicular to the direction of the rail track 30. This travel perpendicular to the left-right direction is made possible by well known means such as perpendicular wheels protruding downwards.

In this way, even when one of the transport cars of FIG. 6 is effecting the loading of a green tire onto a particular vulcanizing press, other transport cars can travel along the rails 30, (in the case when several transport cars are employed to serve a plurality of vulcanizing presses, for example when 5 transport cars are used to serve 30 vulcanizing presses), and it is thus possible to maximize the working efficiency of each transport car and vulcanizing press by systematically controlling the operation of the transport cars.

If one transport car has a serving range limited to 6 vulcanizing presses, then even if one of the transport cars never breaks down, because the cycles of each vulcanizing press are not identical, there occurs cases when even if one vulcanizing press has completed vulcanizing, it might have to wait a certain time until the transport car has completed the operation of another vulcanizing press. Of course group control of the total number of vulcanizing presses, can help to avoid such cases as much as possible. However, even when such group control is used, if the system shown in FIG. 6 is employed, a transport car available for dispatch moves to the vulcanizing press requiring a green tire and it is possible to effect insertion of the green tire, etc..

Further, it is also possible to employ a system wherein, when one robot has stopped due to a sudden accident such as breakdown etc., the transport car may be retreated to a refuge station S2 where it does not interfere with the travel of the other transport cars through the use of branch rails 32 which are branched off from the main rails 30 in a suitable number of locations (for example, 1 for every 5 or 6 vulcanizing presses producing passenger car tires) and wherein the remaining other transport cars act as back-up.

Also, in the above described embodiments, the case where the transport cars travel along the ground has been described. However it also possible to erect rails on the ceiling and and to use transport cars which travel along such rails.

According to the loading system and loading method of the present invention, loaders which were attached to each of the tire vulcanizing presses are removed and transport cars having robot arms are provided, 1 transport car for several tire vulcanizing presses (in the case of tire vulcanizing presses producing passenger car tires 1 transport car for every 5–6 vulcanizing presses), thus making it possible to effect overall cost-down of the tire vulcanizing factory. Also, by eliminating the loaders from each of the tire vulcanizing presses, the physical space around the molds and at the front of the vulcanizing press is increased and it thus becomes easier to effect many operations, in particular automatic or semi-automatic mold replacement work.

Also, by effecting the picking-up of green tires and the loading of green tires onto the mold center using position correction means employing a visual sensor etc., the setting accuracy is assured and there is no need to carry out the regular correction adjustment work that was necessary with the loaders of the prior art. Furthermore, in the prior art loaders, the green tire cradles were set in a specific position of the vulcanizing press (the position to which the loader rotated) and it was necessary to load the green tire correctly onto this cradle. However using the combination loaders of this invention comprising transport cars and robot arms, even if the green tire cradle is not in front of the specific vulcanizing press, since the transport car can travel to pick up the green tire, it is possible to locate the tires over a wide area.

Also, by employing a position detection sensor such as a visual sensor, it is possible to distinguish the green tire to be chucked, and the green tire can be picked up in a correct position by monitoring of the prescribed datum by the visual sensor etc. without the need for exact positioning of the cradle itself or of the green tire on the cradle.

What is claimed is:

1. A loading system for a vulcanizing press, comprising:
   a transport car displaceable to access a plurality of tire vulcanizing presses;
   a robot disposed on said transport car, said robot comprising an articulated robot arm assembly movable in three (XYZ) directions, said robot further including a tire chuck disposed on an end of said robot arm assembly; and
   a sensor disposed centrally on the end of said robot arm assembly and within said tire chuck, said sensor configured to sense a centering location disposed on the vulcanizing press.

2. A loading system as recited in claim 1, wherein said sensor comprises means for sensing a center post of a bladder operating device of a vulcanizing press.

3. A loading system as recited in claim 2, wherein said robot arm assembly comprises a rotation arm for rotating said robot arm assembly relative to said transport car.

4. A loading system as recited in claim 3, wherein said robot arm assembly further comprises first, second and third arms disposed between said rotation arm and said tire chuck.

5. A loading system as recited in claim 4, further including a first joint disposed between said rotation arm and said first arm, a second joint disposed between said first arm and said second arm, and a third joint disposed between said second arm and said third arm.

6. A loading system as recited in claim 1, wherein said robot arm assembly comprises a rotation arm for rotating said robot arm assembly relative to said transport car.

7. A loading system as recited in claim 6, wherein said robot arm assembly further comprises first, second and third arms disposed between said rotation arm and said tire chuck.

8. A loading system as recited in claim 7, further including a first joint disposed between said rotation arm and said first arm, a second joint disposed between said first arm and said second arm, and a third joint disposed between said second arm and said third arm.

9. A loading system as recited in claim 1, further including a rail track extending along a line of vulcanizing presses, and a plurality of branch rails extending transverse to said rail track, and wherein said transport car moves onto one of said branch rails during loading of a tire onto a vulcanizing press.

10. A loading method for a vulcanizing press, comprising:
    providing a transport car displaceable along a plurality of tire vulcanizing presses, said transport car having a robot including an articulated robot arm assembly movable in three (XYZ) directions mounted thereon, and a tire chuck disposed on an end of the robot arm assembly, disposing a sensor centrally on the end of the robot arm assembly and within said tire chuck;

moving said transport car to a vulcanizing press;

after moving said transport car, picking up a green tire from a supply location utilizing said tire chuck;

using the sensor mounted within said chuck for sensing a centering location disposed on said vulcanizing press; and loading said green tire onto the vulcanizing press so as to position a center axis of said green tire on a center of said centering location.

11. A method as recited in claim 10, further comprising detecting a center post of a bladder operating device of the vulcanizing press utilizing said sensor for centering the green tire.

12. A method as recited in claim 11, further including providing, as said robot arm assembly, an assembly including a rotation arm for rotating said robot arm assembly relative to said transport car, and first, second and third arms, and wherein a first joint is disposed between said rotation arm and said first arm, a second joint is disposed between said first arm and said second arm, and a third joint is disposed between said second arm and said third arm.

13. A method as recited in claim 10, further including providing a rail track extending along a line of vulcanizing presses, and providing a plurality of branch rails extending from said rail track, the method further comprising moving said transport car off of said rail track and onto one of said branch rails for loading a green tire onto a vulcanizing press.

14. A method as recited in claim 10, further including disposing pallets such that at least one pallet is accessible by said robot at each of said plurality of tire vulcanizing presses, and wherein a tire is picked up from one of said pallets after movement of the transport car is completed.

15. A method as recited in claim 10, further including providing a pair of robots on said transport car.

* * * * *